(12) United States Patent
Wang et al.

(10) Patent No.: US 10,932,213 B2
(45) Date of Patent: Feb. 23, 2021

(54) COMMUNICATION LINK ACQUISITION AND TRACKING IN MILLIMETER WAVE BANDS

(71) Applicant: Huawei Technologies Co., Ltd., Shenzhen (CN)

(72) Inventors: Peng Wang, Kista (SE); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 16/268,241

(22) Filed: Feb. 5, 2019

(65) Prior Publication Data
US 2019/0182786 A1 Jun. 13, 2019

Related U.S. Application Data

(63) Continuation of application No. PCT/EP2016/069076, filed on Aug. 10, 2016.

(51) Int. Cl.
*H04W 56/00* (2009.01)
*H04B 7/06* (2006.01)
(Continued)

(52) U.S. Cl.
CPC ...... *H04W 56/0015* (2013.01); *H04B 7/0695* (2013.01); *H04B 7/088* (2013.01); *H04B 17/318* (2015.01)

(58) Field of Classification Search
CPC ............. H04W 56/001; H04W 56/002; H04W 56/0095; H04W 16/28; H04W 72/046;
(Continued)

(56) References Cited

U.S. PATENT DOCUMENTS 7,965,759 B2 * 6/2011 Luo ............... H04L 25/03866
375/146
2016/0150435 A1 5/2016 Baek et al.
(Continued)

FOREIGN PATENT DOCUMENTS

WO 2016086144 A1 6/2016

OTHER PUBLICATIONS

Islam et al., U.S. Appl. No. 62/338,484 (Year: 2016).*
(Continued)

*Primary Examiner* — Ashley Shivers
(74) *Attorney, Agent, or Firm* — Leydig, Voit & Mayer, Ltd.

(57) ABSTRACT

A network node for a wireless communication system includes a processor and a transceiver, the processor being configured to generate a set of at least two synchronization signal sequences; construct a synchronization signal for each synchronization signal sequence to create a set of synchronization signals, such that each of the synchronization signals in the set of synchronization signals has an auto correlation and cross correlation below a threshold value with any other synchronization signal in the set of synchronization signals; generate a set of directional beam patterns, wherein each beam pattern in the set of directional beam patterns corresponds to one of the synchronization signals in the set of synchronization signals; and wherein the transceiver is configured to transmit the synchronization signals in the set of synchronization signals using the beam pattern for each synchronization signal over a same time frequency resource.

15 Claims, 10 Drawing Sheets

(51) Int. Cl.
H04B 7/08 (2006.01)
H04B 17/318 (2015.01)

(58) Field of Classification Search
CPC . H04W 56/0015; H04B 7/0695; H04B 7/088; H04B 17/318
See application file for complete search history.

(56) References Cited

U.S. PATENT DOCUMENTS

| | | | | |
|---|---|---|---|---|
| 2017/0099126 | A1* | 4/2017 | Yoo | H04L 5/0048 |
| 2017/0302414 | A1* | 10/2017 | Islam | H04L 5/0048 |
| 2018/0176065 | A1* | 6/2018 | Deng | H04B 7/0695 |
| 2018/0359790 | A1* | 12/2018 | Ingale | H04W 72/048 |

OTHER PUBLICATIONS

Yoo et al., U.S. Appl. No. 62/237,176 (Year: 2017).*
"Discussion on Multi-Antenna Transmission of Synchronization and Reference Signals," 3GPP TSG RAN WG1 Meeting #85, XP051089823, R1-165180, pp. 1-5, Nanjing, China , 3rd Generation Partnership Project—Valbonne, France (May 23-27, 2016).
"Access mechanism for beam based approach",3GPP TSG RAN WG1 Meeting #86, XP051132464, R1-166088, pp. 1-8, Gothenburg, Sweden, 3rd Generation Partnership Project—Valbonne, France (Aug. 22-26, 2016).
Desai et al., "Initial beamforming for mmWave communications," pp. 1-5, in Proc. The 48th Asilomar Conference on Signals, Systems and Computers (2014).
Capone et al., "Context-based cell search in millimeter wave 5G networks," submitted to VTC2015-Spring—Massive MIMO and Millimeter-waves for 5G Networks Workshop, Available at http://arxiv.org/abs/1501.02223, pp. 1-5 (2015).
Capone et al., "Context Information for fast cell discovery in mm-Wave 5G networks," in Proc. 21th European Wireless Conference, Budapest Hungary, pp. 1-6 (May 20-22, 2015).
Barati et al., "Directional Initial Access for Millimeter wave Cellular systems," available at http://arxiv.org/abs/1511.06483, pp. 1-12, Institute of Electrical and Electronics Engineers—New York, New York (Nov. 20, 2015).
Barati et al., "Directional Cell Discovery in Millimeter Wave Cellular Networks," IEEE Transactions on Wireless Communications, pp. 6664-6678,vol. 14, No. 12, Institute of Electrical and Electronics Engineers—New York, New York (Dec. 2015).
Barati et al., "Directional cell search for millimeter wave cellular systems," in Proc. IEEE 15th International Workshop on Signal Processing Advances in Wireless Communications (SPAWC), Toronto, Canada, pp. 1-5, Institute of Electrical and Electronics Engineers—New York, New York (Jun. 22-25, 2014).
Liu et al.,"Design and Analysis of Transmit Beamforming for Millimeter Wave Base Station Discovery," pp. 1-30, available at http://arxiv.org/abs/1604.01160 (Sep. 8, 2016).
Giordani et al., "Initial Access in 5G mm-Wave Cellular Networks," submitted to IEEE COMMAG 2016. Available at http://arxiv.org/abs/1602.07731, pp. 1-8, Institute of Electrical and Electronics Engineers—New York, New York (May 24, 2016).
Popovic, "Generalized Chirp-Like Polyphase Sequences with Optimum Correlation Properties," IEEE Transactions on Information Theory, vol. 38, No. 4, pp. 1-4, Institute of Electrical and Electronics Engineers—New York, New York (Jul. 1992).
Surra et al., "Synchronization Sequence Design for mmWave Cellular Systems," in Proc. 11th Annual IEEE CCNC-Wireless Communications Track, pp. 617-622, Institute of Electrical and Electronics Engineers—New York, New York (2014).
Alkhateeb et al.,"Channel Estimation and Hybrid Precoding for Millimeter Wave Cellular Systems," IEEE Journal of Selected Topics in Sig. Process, (JSTSP), vol. 8, No. 5, pp. 1-16, Institute of Electrical and Electronics Engineers—New York, New York (Oct. 2014).
Akdeniz et al., "Millimeter Wave Channel Modeling and Cellular Capacity Evaluation," IEEE Journal on Selected Areas in Communications (JSAC), vol. 32, No. 6, pp. 1164-1179, Institute of Electrical and Electronics Engineers—New York, New York (Jun. 2014).
Proakis, "Digital Communications," New York: McGraw Hill, pp. 1-938 (1989).
Kokshoorn et al., "Fast Channel Estimation for Millimetre Wave Wireless Systems Using Overlapped Beam Patterns," in Proc. IEEE Int. Conf. Commun., (ICC2015), pp. 1304-1309, London, UK., Institute of Electrical and Electronics Engineers—New York, New York (Jun. 8-12, 2015).

* cited by examiner

COMMUNICATION LINK ACQUISITION AND TRACKING IN MILLIMETER WAVE BANDS

CROSS-REFERENCE TO RELATED APPLICATIONS

This application is a continuation of International Application No. PCT/EP2016/069076, filed on Aug. 10, 2016, the disclosure of which is hereby incorporated by reference in its entirety.

TECHNICAL FIELD

The aspects of the present disclosure relate generally to wireless communication systems and more particularly to millimeter wave cellular communication systems.

BACKGROUND

The initial access procedures in a millimeter wave (mmWave) cellular system include time and frequency synchronization, physical cell ID acquisition and channel direction information. For the channel direction information, the direction of departure (DoD)/direction of arrival (DoA) of strong channel paths is expected to be acquirable and tractable. Determining the channel direction information can depend upon how the synchronization signals are transmitted from the Evolved Universal Terrestrial Radio Access Network NodeB or evolved NodeB (eNB) and how the synchronization signals (SS) are detected at the user equipment (UE).

In some cases, the synchronization signal is sequentially transmitted and received in the time domain via a set of different directional beam patterns to scan the whole DoD/DoA angular spaces. By allowing the transmitter and receiver to respectively scan across the whole DoD/DoA angular spaces, the channel direction can be obtained by comparing the received power levels that correspond to different transmit-receive beam combinations. However, such sequential beam scanning significantly increases the overhead or slows down the initial access procedure, as many more synchronization signal transmission/receptions are required in each scan round to search over potentially large angular spaces.

The eNB can also transmit the synchronization signal using multiple directional beam patterns that span the whole DoD angular space over distinct frequency sub-bands. At the user equipment (UE) a number of directional combining beams are prepared, each of which is used to combine all sub-bands that the eNB transmits on. The channel DoD information is associated with the frequency sub-band indexes via the one-to-one mapping between the directional transmit beams and frequency sub-bands. The channel DoD information can be determined at the UE by detecting the sub-band on which the highest signal power is received. Since each directional beam needs to occupy a distinct sub-band, this can lead to reduced bandwidth for each directional synchronization signal and in turn, low timing accuracy. Also, either a wide bandwidth is required to contain a large number of sub-bands for the eNB to transmit that many directional beams, leading to an increased overhead, or the eNB can only assign a few sub-carriers to each sub-band, which reduces the dimension of SSs and complicates the SS waveform design.

Accordingly, it would be desirable to be able to provide a synchronization signal transceiving scheme for initial access in a mmWave cellular system in a manner that addresses at least some of the problems identified above.

SUMMARY

It is an object of the disclosure to provide an efficient synchronization signal transceiving scheme for initial access in a mmWave cellular system. This object is solved by the subject matter of the independent claims. Further advantageous modifications can be found in the dependent claims.

According to a first aspect of the disclosure the above and further objects and advantages are obtained by a network node for a wireless communication system, the network node including a processor and a transceiver, the processor being configured to generate a set of at least two synchronization signal sequences; construct a synchronization signal for each synchronization signal sequence to create a set of synchronization signals, such that each of the synchronization signals has an auto correlation and cross correlation below a threshold value with any other synchronization signal in the set of synchronization signals; generate a set of directional beam patterns, wherein each beam pattern in the set of directional beam patterns corresponds to one of the synchronization signals in the set of synchronization signals; and wherein the transceiver is configured to transmit the synchronization signals in the set of synchronization signals using the beam pattern for each synchronization signal over a same time frequency resource. The aspects of the disclosed embodiments provide for multiple synchronization signals, each of which is DoD specific, to be transmitted over the same time frequency resource.

In a first possible implementation form of the network node according to the first aspect the transceiver is configured to receive a message that identifies one or more index values associated with respective ones of the synchronization signals having a highest received power level(s) among all of the synchronization signals in the set of received synchronization signals, and the processor is configured to select at least one index value associated with a highest received power level, and select a transmission mode of the network node to a transmission channel corresponding to a direction of departure associated with a synchronization signal of the selected index value. The aspects of the disclosed embodiments enable the network node to use feedback based on the received power levels of the synchronization signals to select a transmission channel providing a beam direction that is most preferable to the user node. This allows beam forming gain to be achieved at the network node in the subsequent random access and data transmission phases.

In a second possible implementation form of the network node according to the first possible implementation form of the first aspect, the processor is configured to select at least one other index value associated with at least one other highest received power level, and select the transmission mode of the network node for parallel transmission in transmission channels corresponding to the DoD associated with the synchronization signal of each selected index value. The aspects of the disclosed embodiments enable the network node to use feedback based on the received power levels of the synchronization signals to select a transmission channel providing at least two beam directions that are most preferable to the user node. This allows both beam forming gain and multiplexing gain to be achieved at the network node in the subsequent random access and data transmission phases.

In a third possible implementation form of the network node according to the first and second possible implementation forms, the processor is configured to compare a received power level corresponding to a current transmission mode to the highest received power levels corresponding to the synchronization signals associated with the identified one or more index values, and switch the transmission mode of the network node to one or more transmission channels corresponding to the synchronization associated with identified index values when the highest received power levels are greater than the current received power level. The network node can be updated with any changes in the received power levels of the synchronization signals and switch to a channel that provides a beam direction mode more preferable to the user node. This allows seamless switching between channel paths for achieving QoS guarantees.

In a fourth possible implementation form of the network node according to the first aspect as such or according to any one of the preceding possible implementation forms, the transceiver is configured to periodically transmit the synchronization signals over the same time-frequency resource simultaneously. The aspects of the disclosed embodiments provide for multiple synchronization signals, each of which is DoD specific, to be transmitted over the same time frequency resource.

In a fifth possible implementation form of the network node according to the first aspect as such or according to any one of the preceding possible implementation forms the processor is configured to construct each synchronization signal using one synchronization signal sequence from the set of synchronization signal sequences and superimpose the constructed synchronization signals together. The aspects of the disclosed embodiments provide DoD specific synchronization signal waveforms constructed using one synchronization signal sequence carried by distinct directional beam patterns.

In a sixth possible implementation form of the network node according to the first aspect as such or according to any one of the preceding possible implementation forms the processor is configured to select each synchronization signal sequence from a Gold or Kasami sequence set. Gold/Kasami sequences are known to have good auto-correlation and cross-correlation.

In a seventh possible implementation form of the network node according to the first aspect as such or according to any one of the first through fifth possible implementation forms the processor is configured to select each synchronization signal sequence from a set of Zadoff-Chu sequences with different roots. This is advantageous in that the length of the synchronization signal sequence is more flexible unlike other sequences that have length limitations, and they provide good auto correlation and cross correlation.

In an eighth possible implementation form of the network node according to the first aspect as such or according any one of the first through fifth possible implementation forms, the processor is configured to select each synchronization signal sequence from a set of sequences that are different cyclically shifted versions of a common Zadoff-Chu sequence. This is advantageous in that the length of the synchronization signal sequence is more flexible unlike other sequences that have length limitations, and they provide good auto correlation and zero cross correlation at zero time delay.

In a ninth possible implementation form of the network node according to the first aspect as such or according to any one of the first through fifth possible implementation forms the processor is configured to select each synchronization signal sequence from a set of Golay complementary orthogonal sequences. This is advantageous in that the length of the synchronization signal sequence is more flexible unlike other sequences that have length limitations, and they provide good auto correlation and zero cross correlation at zero time delay.

In a first possible implementation form according to any one of the seventh through ninth possible implementation forms the processor is configured to interleave the selected sequences using a common interleaver. The interleaving operation makes all of the sequences pseudo-random and results in a lower cross-correlation between them.

In a second possible implementation form according to any one of the seventh through ninth possible implementation forms the processor is configured to scramble the selected sequences using a common scrambling sequence. The scrambling operation makes all of the sequences pseudo-random and results in a lower cross-correlation between them.

In a tenth possible implementation form of the network node according to the first aspect as such or according to any one of the preceding possible implementation forms the same time frequency resource comprises resource elements that span across multiple sub-carriers and OFDM symbols. The structure of the synchronization signal of the disclosed embodiments allows the network node to transmit multiple synchronization signals simultaneously over the same frequency band.

According to a second aspect of the disclosure the above and further objects and advantages are obtained by a user node for a wireless communication system, the user node including a processor and a transceiver, the transceiver being configured to receive a signal from a same time frequency resource; the processor being configured to detect at least one synchronization signal among a set of synchronization signals from the received signal; compare a received power level of at least one synchronization signal from the set of synchronization signals with a received power level of at least one other received synchronization signal from the set of synchronization signals; identify at least one index value associated with at least one received synchronization signal having a highest received power level among all of the received synchronization signals from the set of synchronization signals; and wherein the transceiver is configured to transmit the identified at least one index value. The aspects of the disclosed embodiments allow the user node to acquire not only the frequency-time synchronization and cell ID, but to also estimate the channel direction information, especially the DoD, upon the successful detection of synchronization signal sequences. The user node can advantageously provide feedback to the network node on the synchronization signal with the highest received power, which allows the network node to select a transmission channel providing a beam direction that is most preferable to the user node. This also allows beam forming gain to be achieved at the network node in the subsequent random access and data transmission phases.

In a first possible implementation form of the user node according to the second aspect as such the processor is configured to detect at least one other synchronization signal from a set of subsequently received signals; compare a received power level of the at least one other received synchronization signal to a received power level of at least one other received synchronization signal from the set of subsequently received signals; and wherein the transceiver is configured to transmit a report identifying a received power fluctuation of each received synchronization signal. The user node continues to detect the multiple transmitted synchronization signals for channel tracking.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Figure 1:
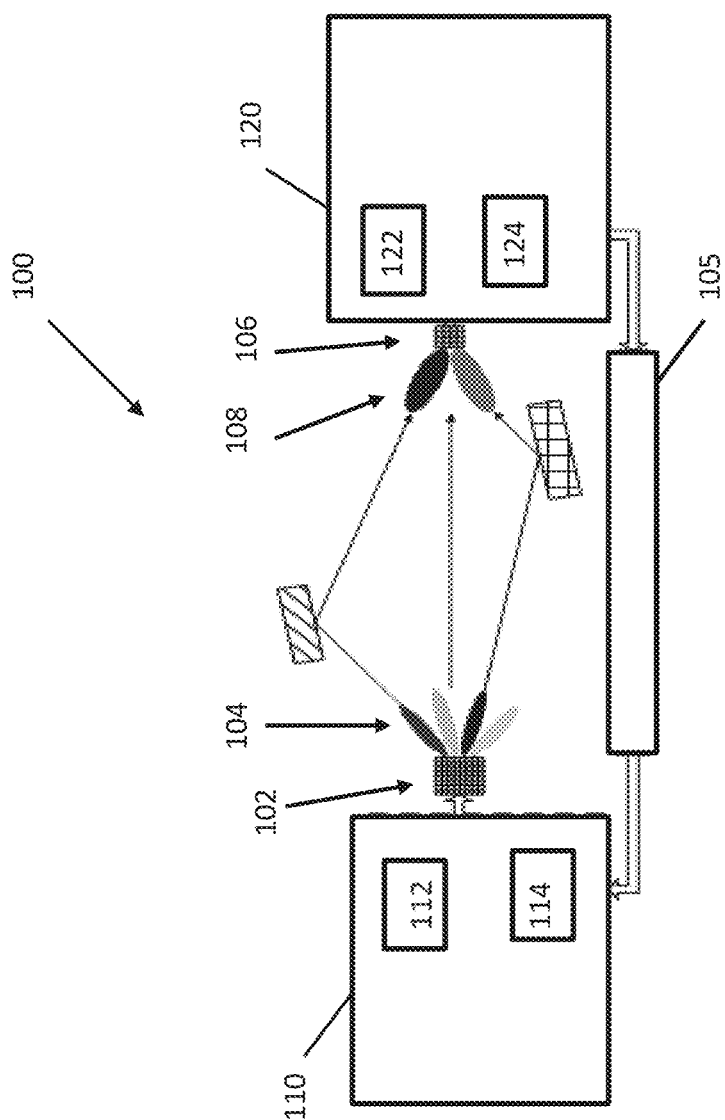
FIG. 1 is a block diagram illustrating an exemplary wireless communication system incorporating aspects of the disclosed embodiments.

Referring to FIG. 1 there can be seen an exemplary block diagram of a wireless communication system 100 incorporating a synchronization signal transceiving scheme for initial access in a mmWave cellular system in accordance with the aspects of the disclosed embodiments. The aspects of the disclosed embodiments are directed to transmitting synchronization signals (SSs) in such a way that they are "both directional and omni-directional" in the spatial domains, by further exploiting the code domain. The synchronization signal transceiving scheme of the disclosed embodiments achieves a better trade-off between the beam forming (BF) gain and time efficiency without incurring the disparity problem between the synchronization signal range and the data transmission range in a mmWave cellular system. The system 100 of the disclosed embodiments also enables the user equipment to acquire the time/frequency synchronization and cell ID, and the DoD (DoA) information upon the successful detection of the synchronization signals.

As is illustrated in FIG. 1, the wireless communication system 100 includes at least one network node 110 and at least one user node or user equipment 120. The wireless communication system 100 can be any suitable type of wireless communication system, such as for example, but not limited to LTE, 5G or new radio (NR). In one embodiment, the network node 110 can comprise or include a network node such as an Evolved Universal Terrestrial Radio Access Network (E-UTRAN) NodeB or evolved NodeB (eNB). The user node 120 can comprise or include a user node or equipment (UE) such as a mobile communication device, for example.

In the example of FIG. 1, the network node 110 includes at least one processor 112 and at least one transceiver device 114. While the processor 112 and transceiver 114 are shown in FIG. 1 as being separate devices, in alternate embodiments, the processor 112 and transceiver device 114 can comprise a single device. The network node 110 can include any suitable number of processors 112 and transceivers 114, depending upon the particular application and implementation.

The network node 110 can also include one or more antennas or antenna arrays 102. The antennas or antenna arrays 102 will be generally configured to generate one or more directional beams, generally referred to herein as directional beams 104.

The user node 120 generally includes a transceiver 122 and a processor 124. Although the transceiver 122 and processor 124 are shown in the example of FIG. 1 as separate devices, in alternate embodiments, the transceiver 122 and processor 124 can comprise a single device or unit. The user node 120 can include any suitable number of transceivers 124 and processors 122, depending upon the particular application and implementation.

The user node 120 will also include one or more antennas or antenna arrays 106. The antennas 106 are configured to generate one or more receiving beam patterns 108, to receive, among other things, the signals transmitted from the network node 110.

The network node 110 of the disclosed embodiments is configured to generate a set of at least two synchronization signal sequences and construct a synchronization signal for each synchronization signal sequence to create a set of synchronization signals. The multiple synchronization signals of the disclosed embodiments are mutually orthogonal (or nearly mutually orthogonal) in both the spatial and code domains and will have auto correlation and cross correlation below a threshold value with any other synchronization signal in the set of synchronization signals.

In one embodiment, the network node 110 is configured to generate a set of directional beam patterns 104, wherein each beam pattern in the set of directional beam patterns 104 corresponds to one of the synchronization signals in the set of synchronization signals. Each synchronization signal will be defined by a distinct direction beam pattern by which a DoD-specific synchronization signal sequence is carried. The set of directional beam patterns will cover the whole angular domain of the DoD.

The transceiver 114 of the network node 110, such as an eNB, is configured to transmit the multiple synchronization signals simultaneously over the same frequency band or a same time frequency resource. The directional beam patterns 104 jointly form an omni-directional beam pattern and enable different DoD sub-ranges to be identified at the user node 120 by detecting their corresponding synchronization signals.

At the user node 120, upon successful synchronization signal detection, the index(es) of the synchronization signal(s) with the highest received power will be fed back to the network node 110. In one embodiment, the feedback information can be fed back to the user node using a feedback channel 105. In this manner, the network node 110 can learn the DoD sub-range that is the most preferable for that user node 120. Therefore, the beamforming (BF) gain can be achieved at the network node 110 in the subsequent random access and data transmission phases.

The synchronization signal transmission scheme of the disclosed embodiments will also facilitate subsequent channel tracking of mmWave cellular systems. With simultaneous and periodic synchronization signal transmissions, the user node 120 can keep monitoring the received power levels of these DoD-specific synchronization signals. Generally, the channel path with its DoD/DoA corresponding to the synchronization signal having the highest received power level is selected for transmission/reception by default. However, once the user node 120 detects a different synchronization signal whose received power level is higher or becomes the highest compared to other synchronization signals in the set, the user node 120 can feed this information back to the network node 110. In one embodiment, this information can be fed back to the network node 110 in the form of a periodic or non-periodic message or report. The network node 110 is configured to be able to adjust the transmission towards that new DoD after receiving the index of this new synchronization signal as a feedback from the user node 120. This enables seamless switching between channel paths for achieving QoS guarantee.

Figure 2:
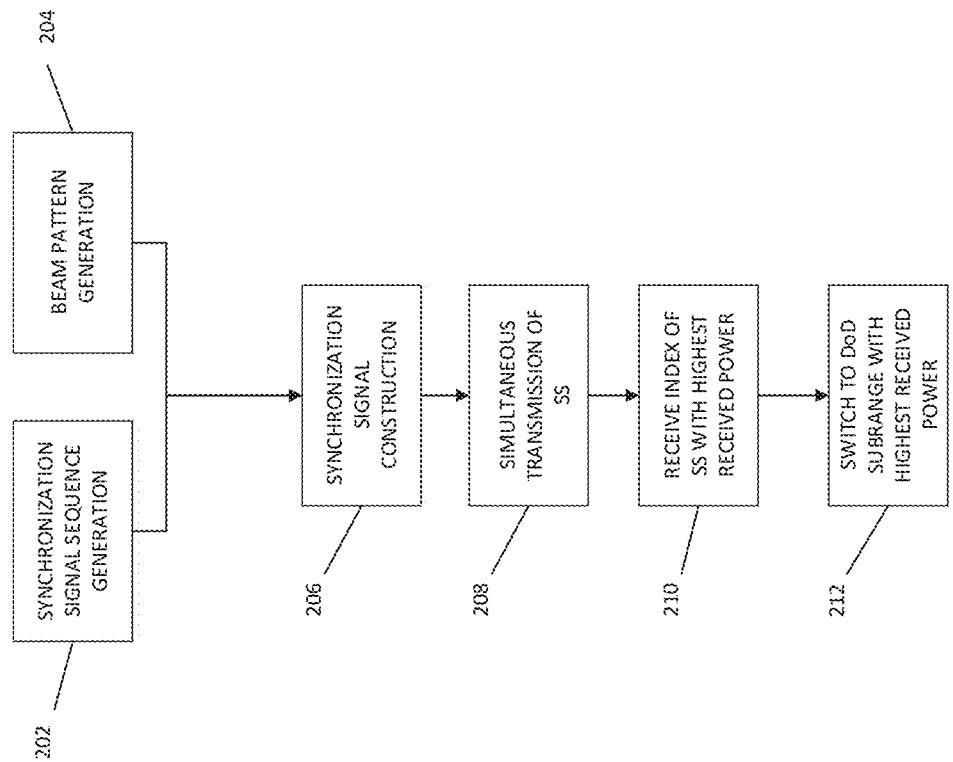
FIG. 2 illustrates a exemplary process flow of network node operations in a system incorporating aspects of the disclosed embodiments.

FIG. 2 illustrates one example of a process at a network node 110 incorporating aspects of the disclosed embodiments. In this example, a set of at least two synchronization signal sequences that are known by both the network node 110 and the user node 120 are generated 202. The network node 120 is also configured to generate 204 a number of directional beam patterns to transmit these synchronization signal sequences. Generally, the number of directional beam patterns will be no less than the number of synchronization signal sequences in the set of synchronization signal sequences. When they are the same, there will be a one to one mapping.

A set of synchronization signals is constructed 206, where each synchronization signal is DoD specific As will be described below, each of the synchronization signals in the set of synchronization signals will have an auto correlation and cross correlation below a threshold value with any other synchronization signal in the set of synchronization signals. In one embodiment, each DoD-specific synchronization signal waveform is constructed using one synchronization signal sequence carried by a distinct directional beam pattern. The synchronization signal waveforms are superimposed together, in that the synchronization signals share the same time frequency resource. The synchronization signals can then be simultaneously transmitted 208 by the network node 110 over the same time frequency resource.

The network node 110 is configured to receive 210 at least one index value associated with at least one synchronization signal from the set of synchronization signals that has the highest received power level at the user node 120. The network node 110 can then select 212 the channel associated with the DoD corresponding to the highest received power level at the user node 120 for the transmission mode of the network node 110. In this manner, the network node 110 learns the DoD sub-range that is most preferable for the user node 120 and can transmit towards the DoD sub-range to achieve a required level of QoS.

Figure 3:
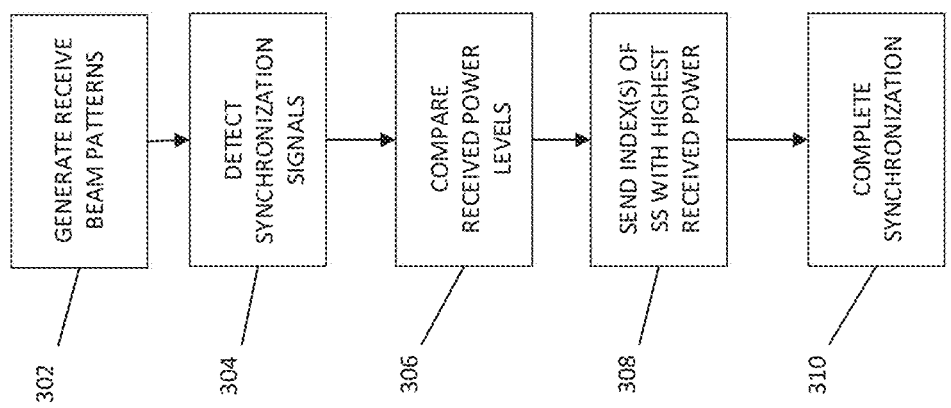
FIG. 3 illustrates a schematic diagram of an exemplary process flow in a user node of a system incorporating aspects of the disclosed embodiments.

At the side of the user node 120, referring to FIG. 3, in one embodiment, the user node 120 is configured to generate 302 a set of directional beam patterns for synchronization signal reception. Signals, such as the synchronization signal from the network node 110 are received at the user node 120, using for example, the transceiver 122. In one embodiment, the processor 124 of the user node 120 is configured to detect at least one synchronization signal from a set of received synchronization signals in a signal received by the transceiver 122. The user node 120 tries to detect 304 all the synchronization signal sequences from the received synchronization signals.

Generally, the synchronization signal received at the user node 120 is the distorted (by the channel) version of the transmitted synchronization signal, which occupies the same time frequency resource as the transmitted synchronization signal. Without a timing reference, the user node 120 does not know when the transmitted synchronization signal arrives at the transceiver 122. The user node 120 cannot identify the correct time-frequency resource occupied by the transmitted synchronization signal before detection. In practice, the user node keeps receiving the signal, resulting in one or more received signal stream(s) of semi-infinite length. Then, among these semi-infinitely long received signals, the user node 120 tries to detect all the synchronization signals.

In one embodiment, the user node 120 is configured to compare 306 and determine the received power level of at least one synchronization signal that is detected and identify the at least one synchronization signal with the highest received power at the user node 120. In one embodiment, the processor 124 of the user node 120 is configured to compare the received power levels of each of the synchronization signals and identify the synchronization signals with the highest received power levels. This can include comparing the received power levels against a threshold or predetermined power value or ranking the received power levels of each of the synchronization signals. The aspects of the disclosed embodiments can include identifying just one synchronization signal, such as the synchronization signal have the highest power level as compared to all other synchronization in the set. Alternatively, all synchronization signals with a power level at or above the pre-determined threshold can be identified. In another embodiment, a percentage of the number of the synchronization signals with the highest received power level can be identified.

The user node 120 can then transmit 308 the index value associated with the at least one synchronization signal having the highest, or one of the highest, received power level(s) to the network node 110. In one embodiment, the user node 120 can then complete 310 the synchronization process with the network node 110 and the user node 120 can be considered a synchronized user node.

In one embodiment, the synchronized user node 120 is configured to perform random access (RA) and feedback the index of subsequently detected synchronization signals with the highest received power to the network node 110. For example, in one embodiment, the processor 124 of the user node 120 is configured to detect at least one other synchronization signal from a set of subsequently received synchronization signals that is received by the transceiver 122. The processor 124 can be configured to compare the received power levels of the synchronization signals in this set of subsequently received synchronization signals and select at least one other index value associated with at least one other highest received power level, as is generally described above. These index values(s) can be fed back to the network node 110.

After receiving feedback on the index of a new synchronization signal with a higher received power level, the network node 110 can be configured to switch the transmission mode for parallel transmission in transmission channels corresponding to the DoD associated with the new synchronization signal(s). The aspects of the disclosed embodiments enable the network node 110 to use feedback on the received power levels of subsequently transmitted synchronization signals to select a transmission channel providing a beam direction that is most preferable to the user node 120. This allows beam forming gain to be achieved at the network node 110 in the subsequent random access and data transmission phases, as well as seamless switching between channel paths for achieving QoS guarantees.

Referring again to FIG. 2, the formation and generation 202, 204 of the multiple synchronization signal sequences and directional beam patterns enables the network node 110 and the user node 120 to learn the initial directions of communication during the initial access process. In one embodiment, the generation 202 of the multiple synchronization signal sequences includes preparing a number of $K_T$ length-$N_S$ SS sequences, denoted by column vectors $s_1$, $s_2$, ..., $s_{K_T}$, at the network node 110, which for purposes of this example is described an eNB. Generally, $K_T \leq N_T$, where $N_T$ is the number of antenna elements at the network node 110. These synchronization signal sequences are assumed to be properly modulated with constant envelope and unit power, i.e., $\|s_k\|=1$, $\forall k=1, 2, \ldots, K_T$ where $\|\cdot\|$ returns the 2-norm of a vector. The synchronization signal sequences should also have both good auto- and cross-correlation properties. For example, for any two synchronization signal sequences i and j, their periodic correlation function, denoted by $R_{i,j}(\tau)$, should satisfy:

$$R_{i,j}(\tau) \approx \begin{cases} \delta(\tau), & \text{if } i = j \\ 0, & \text{if } i \neq j \end{cases} \quad (1)$$

where $\delta(\tau)$ is a Dirac delta function. The good auto-/cross-correlation property will ensure that, with a high probability, different synchronization signal sequences can be separated at the user node 120 and successfully detected at a correct timing.

In one embodiment, the synchronization signal sequences are selected from a Gold or Kasami sequence set. This is advantageous since Gold/Kasami sequence sets are proven to have very good auto-/cross-correlations as illustrated in equation (1).

In another embodiment, the synchronization signal sequences are selected from a set of Zaddoff-Chu (ZC) sequences with different roots, different cyclically shifted versions of a common ZC sequence, or different columns of an orthogonal matrix (e.g., the Golay complementary orthogonal set). This is advantageous as the sequence length $N_S$ is more flexible. The Gold/Kasami sequences can only take a value of $2^n-1$ for an integer n. However, although good auto-correlation and good cross-correlation at zero time delay can be achieved by these sequence designs, they may still lead to high cross-correlation side lobes at certain non-zero time delays.

For example, two different cyclically shifted versions of a common ZC sequence are exactly orthogonal to each other, but there is a high cross-correlation peak of 1 when the delay r in equation (1) equals the difference between their cyclic shifts. Such a high cross-correlation will not only cause a high false alarm probability, but can also lead to the detection of a wrong synchronization signal sequence at the user node 120 and in turn wrong DoD information. To avoid such high cross-correlations, in one embodiment, the synchronization signal sequences are interleaved and/or scrambled using a common interleaving/scrambling sequence. The interleaving/scrambling operation makes all the sequences pseudo-random and results in a lower cross-correlation between them. This common interleaving/scrambling sequence can be randomly generated, or optimized such that the cross-correlation between these synchronization signal sequences is further improved (e.g., one can select an interleaver with a large interleave depth, or exhaust a number of candidate interleavers and select one from them that leads to the best cross-correlation). Since all the synchronization signal sequences are interleaved/scrambled in the same way, their (near) orthogonality is still maintained.

After that, the elements of each synchronization signal sequence $s_i$ are mapped to a given number of sub-carriers in the frequency domain, and converted into the time domain via OFDM or DFT-s-OFDM modulation. These synchronization signal sequences need to be also known at the user node 120 for the user node 120 to perform correlation. In one embodiment, the sets of synchronization signal sequences assigned to different network nodes 110 can be the same. The sets of synchronization signal sequences can also be different, to carry the cell ID. The cell ID configuration can be left to other reference signals, such as for example, the secondary synchronization signals (SSS) used in LTE. This enables the user node 120 to simply retrieve the cell ID via successfully detecting any one of the $K_T$ synchronization signal sequences sent by the same network node 110.

Referring again to FIGS. 1 and 2, in one embodiment, an equal number of $K_T$ directional transmit beam patterns 104 are generated 204 at the network node 110. Each beam pattern k {k=1, 2, ..., $K_T$} is expected to cover a distinct DoD angular sub-range, denoted by $S_{T,k}$. Here the DoD angular sub-range $S_{T,k}$ can either be a convex set, or the union of multiple disjointed convex sub-sets. In the latter case, the corresponding beam pattern may have multiple main lobes pointing to different DoDs. As shown in the exemplary beam pattern design of FIG. 4, all of the transmit beam patterns 104 are required to jointly span the whole DoD angular space (or the angular space of interest), denoted by $S_T$, i.e., $$\bigcup_{k=1}^{K_T} S_{T,k} = S_T. \quad (2)$$

Figure 4:
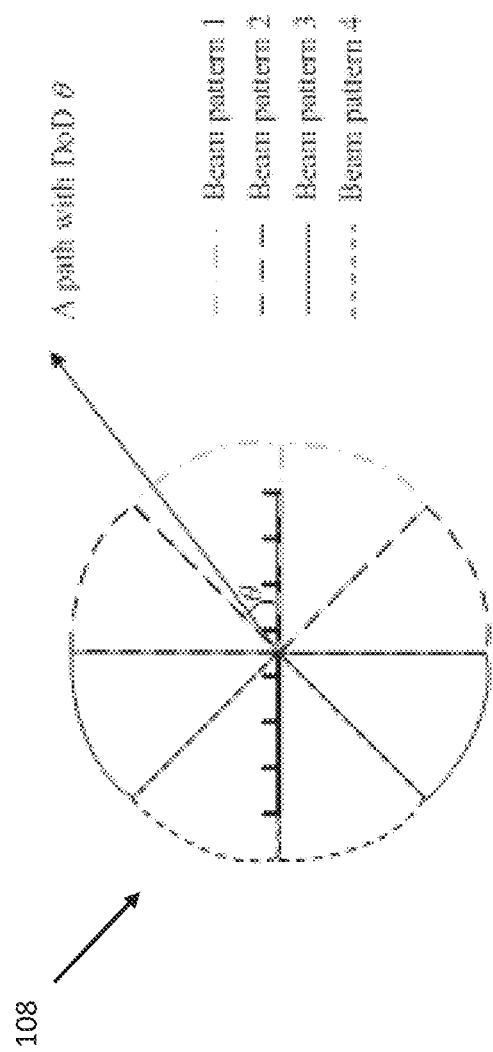
FIG. 4 illustrates an exemplary two-dimensional beam pattern design for a system incorporating aspects of the disclosed embodiments.

FIG. 4 presents a two-dimensional (2D) example of an exemplary beam pattern design, where a uniform linear antenna panel array (ULA) 102 is assumed at the network node 110. The exemplary beam pattern design in FIG. 4 is with $K_T$=4 in the 2D case, with $N_T$=8-element ULA 102. In this example, the whole DoD angular space is given by $S_T$=[0, π]. The symmetry of the ULA guarantees that the remaining DoD angular range [π, 2π] is covered as well. $K_T$=4 directional beam patterns are generated. These four beam patterns cover, respectively, the angular sub-ranges of $S_{T,1}$=[0, π/4], $S_{T,2}$=[π/4, π/2], $S_{T,3}$=[π/2, 3π/4] and $S_{T,4}$=[3π/4, π], and they jointly span the whole angular space, i.e., $S_{T,1} \cup S_{T,2} \cup S_{T,3} \cup S_{T,4}$=[0, π]=$S_T$.

Figure 5:
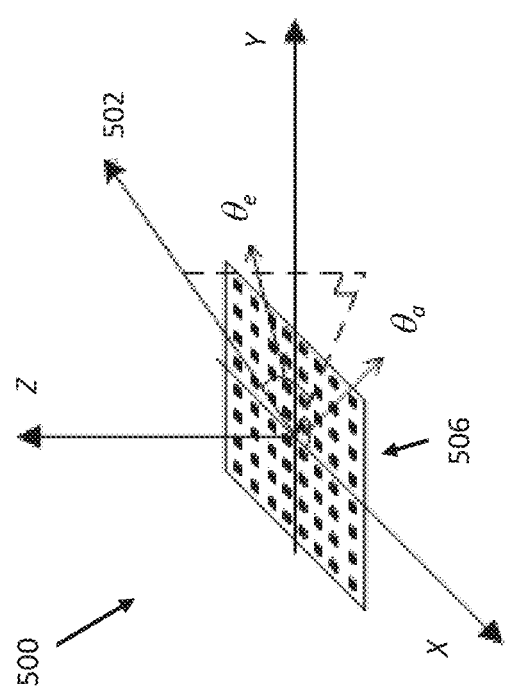
FIG. 5 illustrates an exemplary three-dimensional angular space for a system incorporating aspects of the disclosed embodiments.

FIG. 5 illustrates an example of three-dimensional DoD angular space 500 with $N_T = N_{T,1} \times N_{T,2}$=8×8=64-element Uniform Rectangular Antenna Array (URA) 506. For the general and practical three-dimensional (3D) scenario shown in FIG. 5, the whole angular space should be $S_T$={$(\theta_a, \theta_e) | 0 \leq \theta_a < 2\pi, -\pi/2 \leq \theta_e < \pi/2$}, where $\theta_a$ is the azimuth DoD and $\theta_e$ is the elevation DoD. Reference 502 illustrates a path with the DoD $\theta_a, \theta_e$. The corresponding angular sub-ranges $S_{T,1}, S_{T,2}, \ldots, S_{T,K_T}$ can be defined accordingly such that equation (2) above holds.

Referring again to FIG. 2, to generate 204 the beam k that covers the DoD angular sub-range $S_{T,k}$ (k=1, 2, ..., $K_T$), the corresponding antenna weight vectors (AWV) are designed, which is denoted by $b_k$ (k=1, 2, ..., $K_T$). One method to design {$b_k$} is to let each AWV have the form of the spatial signature for a channel path with a certain DoD. For example, for the 2D scenario with ULA 106 in FIG. 4, we have $$b_k = u_T(\theta) = \frac{1}{\sqrt{N_T}} \left[ 1 \quad e^{j\frac{2\pi d_T}{\lambda}\cos\theta} \quad e^{j\frac{4\pi d_T}{\lambda}\cos\theta} \quad \ldots \quad e^{j\frac{2\pi d_T(N_T-1)}{\lambda}\cos\theta} \right]^T \quad (3)$$

where θ is a proper DoD, $N_T$ is the number of antennas in the ULA 102 at the network node 110, $d_T$ is the antenna spacing within the ULA 102, and λ is the signal wavelength. Similarly, for the general 3D scenario with URA 506 in FIG. 5, we have:

$$b_k = u_T(\theta_a, \theta_e) = \quad (4)$$
$$\frac{1}{\sqrt{N_T}} \left( \left[ 1 \quad e^{j\frac{2\pi d_{T,2}\sin\theta_a\cos\theta_e}{\lambda}} \quad \ldots \quad e^{j\frac{2\pi(N_{T,2}-1)d_{T,2}\sin\theta_a\cos\theta_e}{\lambda}} \right] \otimes \left[ 1 \quad e^{j\frac{2\pi d_{T,1}\cos\theta_a\cos\theta_e}{\lambda}} \quad \ldots \quad e^{j\frac{2\pi(N_{T,2}-1)d_{T,2}\sin\theta_a\cos\theta_e}{\lambda}} \right] \right)$$

where ⊗ is Kronecker product operation, $(\theta_a, \theta_e)$ is a proper DoD, $N_{T,1}$ ($N_{T,2}$) and $d_{T,1}$ ($d_{T,2}$) are, respectively, the number and spacing of the antennas in each row (column) of the URA 506. In this embodiment, the total number of transmit antennas is given by $N_T = N_{T,1} \times N_{T,2}$. The beam pattern generated in this way can achieve the highest BF gain of $N_T$ at a specific DoD, and all its entries has the same amplitude, which facilitates the hardware implementation (e.g., it can be realized in an analog way using a single transceiver followed by a low-cost analog phase shift network).

Another method is to optimize both the amplitudes and phases of the AWV entries. In this case, a number of $N_{TXRU}$ transceivers need to be involved in the beam pattern generation and a hybrid or full-digital hardware structure is required. In general, the relationship between the number of beams (sync signals) $K_T$, the number of transceivers $N_{TXRU}$, and the number network node 110 antenna elements $N_T$ are given by $K_T \leq N_{TXRU} \leq N_T$.

Finally, all the AWVs {$b_1, b_2, \ldots b_{K_T}$} are stored into a codebook. This codebook is agnostic to the user node 120.

Given the synchronization signal sequences and beam patterns (or equivalently AWVs) designed above, the k-th (k=1, 2, ..., $K_T$) synchronization signal is constructed as $$X_k = b_k \cdot x_k^H. \quad (5)$$

where $x_k$ is the time-domain sampled sequence corresponding to the synchronization signal sequence $s_k$ that is allocated in the frequency domain. The length of $x_k$ is determined by the FFT size, denoted by $N_{FFT}$, involved in the OFDM modulation. Therefore, the synchronization signal $X_k$ in equation (5) has the dimension of $N_T \times N_{FFT}$ that span across different transmit antenna elements and time-domain samples. According to the synchronization signal sequences and beam patterns designed above, the different synchronization signals are (nearly) orthogonal to each other in both the spatial and code domains.

These synchronization signals are superimposed together in that they share the same time frequency resource and are transmitted out into the channel by the network node 110 over the same time frequency resource. Thus the overall $N_T \times N_{FFT}$ transmitted signal matrix can be expressed as:

$$X = \sum_{k=1}^{K_T} X_k = \sum_{k=1}^{K_T} b_k \cdot x_k^H. \quad (6)$$

In practice, there may be a hardware constraint, i.e., the number of transceivers 114 at the network node 110 shown in FIG. 1, $N_{TXRU}$, is expected to be small, or even less than $K_T$. In this case, all the $K_T$ synchronization signals can be divided into several groups with the number of synchronization signals in each group no larger than the number of transceivers 114. The different groups can be multiplexed in the time domain, and all the synchronization signals in the same group are still transmitted simultaneously, i.e. over the same time frequency resource.

In summary, the multiple synchronization signals, each of which is DoD-specific, are transmitted simultaneously in the same frequency band. By taking the beamforming gain of each beam into consideration, it can be seen that the power efficiency of the simultaneous transmission scheme in equation (6) is approximately the same as that of a single omni-directional beam transmission that covers the same whole angular DoD range, while allowing the DoD information to be carried in the transmitted signal. The increased path loss can be compensated for by adopting direction beamforming at the user node 120. As to be shown in the numerical results below, the power budget is not a serious concern for practical channel and system setting.

At the user node 120 side, the $N_R \times N_{FFT}$ signal matrix (after removing cyclic prefix (CP)) received at the $N_R$ antenna ends in the t-th period can be written as $$Y(t) = \sqrt{P_T \rho(d)} H(t) X + Z(t) \quad (7)$$

where $P_T$ is the transmission power, ρ(d) is the large-scale propogation loss with d being the distance between the transmitter and receiver, H(t) is the channel matrix and Z(t) is the corresponding noise matrix at the user node 120, whose entries are independent and identically distributed (i.i.d.) complex additive white Gaussian noise (AWGN) variables with mean zero and variance No W, where No is the noise spectral density (including the noise figure at the user node 120) and W is the bandwidth of the spectrum band occupied by the synchronization signals.

The user node 120 can either use an omni-directional (or a fixed) beam pattern 108, or a number of $K_R$ directional beam patterns 108 to combine the signal matrix Y(t) observed at all antenna ends. The latter can be implemented either in parallel (if the hardware at the user node 120 can support it) or sequentially in time. For example, denote by $w_k$ (k=1, 2, . . . , $K_R$) the AWV of the k-th directional beam pattern at the user node 120. All these AWVs $\{w_1, w_2, \ldots, w_{K_R}\}$ can be designed in a similar way as that for $\{b_1, b_2, \ldots, b_{K_R}\}$ discussed before. If the omni-directional (or fixed) beam pattern is used for signal reception, the user node 120 is unable to recognize the DoA information from the detected synchronization signal sequences.

By denoting $y_{k_R}(t)$ as the signal vector received using the $k_R$-th combining AWV $w_{k_R}$ in the t-th SS transmission period, we have:

$$y_{k_R}(t) = (w_{k_R}^H \cdot Y(t))^H, k_R = 1, 2, \ldots, K_R \quad (8)$$

Further correlating the received signal vector $y_{k_R}(t)$ with the $k_T$-th synchronization signal $x_{k_T}$, we obtain:

$$r_{k_R,k_T}(t) = y_{k_R}^H(t) \cdot x_{k_T}, k_T = 1, 2, \ldots, K_T, \text{ and}$$
$$k_R = 1, 2, \ldots, K_R. \quad (9)$$

Note that in practice, the synchronization signal detection in equation (9) is implemented in a sliding window manner to scan over frequency and time for achieving time and frequency synchronization. The synchronization signal correlator outputs are checked with different frequency offset/time delay hypotheses in the sliding window and then it is determined if the synchronization is successful based on these synchronization signal correlator outputs. For each frequency offset/time delay hypothesis, the mean power of each entry $r_{k_R,k_T}(t)$ is calculated in equation (9) over a number of $N_{ch}$ SS transmission periods, i.e., $$\overline{P}_{k_R,k_T} = \frac{1}{N_{ch}} \sum_{t=1}^{N_{ch}} \|r_{k_R,k_T}(t)\|^2, k_T = 1, 2, \ldots, K_T, \quad (10)$$

$$k_R = 1, 2, \ldots, K_R.$$

After checking through these mean powers across all frequency offset/time delay hypotheses in the sliding window, the maximum mean power among them is determined and compared with a given threshold $\Gamma$ that is selected to guarantee a sufficient low false alarm probability. If the maximum mean power is higher than $\Gamma$, it is claimed that the user node 120 is synchronized to the network node 110 with the corresponding frequency offset and time delay. Otherwise the sliding window is moved forward and detection continues.

Denote by $(k_R^{(best)}, k_T^{(best)})$ the index pair of the maximum mean power in the synchronized case, i.e., $$(k_R^{(best)}, k_T^{(best)}) = \underset{\substack{1 \le k_R \le K_R \\ 1 \le k_T \le K_T \\ |\overline{P}_{k_R,k_T}| \ge \Gamma}}{\operatorname{argmax}} \overline{P}_{k_R,k_T}. \quad (11)$$

Then the cell ID may be configured via the index of the $k_T^{(best)}$-th synchronization signal sequence. In addition, refer to $(k_R^{(best)}, k_T^{(best)})$ as the best transmit-receive beam pair of a path that is configured to be existent between the network node 110 and user node 120 with its DoD $\theta \in S_{T,k_T^{(best)}}$ and DoA $\phi \in S_{R,k_R^{(best)}}$. Note that at the correct frequency/time delay hypothesis, there may be multiple correlator outputs whose mean powers are higher than the threshold F. In this case, the transmit/receive beam pair $(k_R, k_T)$ corresponding to each of these correlators can be regarded as a candidate transmit-receive beam pair. Among them, the best transmit-receive beam pair is expected to capture the highest channel energy and should have the highest priority to be fed back to the network node 110 and utilized for transmission/reception by the network node 110 after synchronization is established.

After synchronization, the user node 120 can acquire the system information from the broadcast channel (BCH), i.e., the physical downlink control channel (PDCCH), and then perform random access via the physical uplink control channel (PUCCH) to the network node 110 to which the user node 120 is synchronized. The index of the best transmit/receive beam pair is denoted as $(k_R^{(best)}, k_T^{(best)})$. As referenced in FIG. 3, the index $k_T^{(best)}$ is then fed back 308 from the user node 120 to the network node 110 via the PUCCH, which enables the network node 110 to select the most preferable DoD in the subsequent stage of data transmission to the user node 120. This index information can be represented using $\lceil \log_2 K_T \rceil$ bits and encoded either separately or jointly with other feedback information. Meanwhile, the user node 120 will select the $k_R^{(best)}$-th DoA sub-range as the best data reception direction. The indexes of the other candidate transmit/receive beam pairs and the corresponding channel qualities can also be fed back to the network node 110 if necessary, which can provide the network node 110 with more information to schedule the service to the user node 120.

Figure 6:
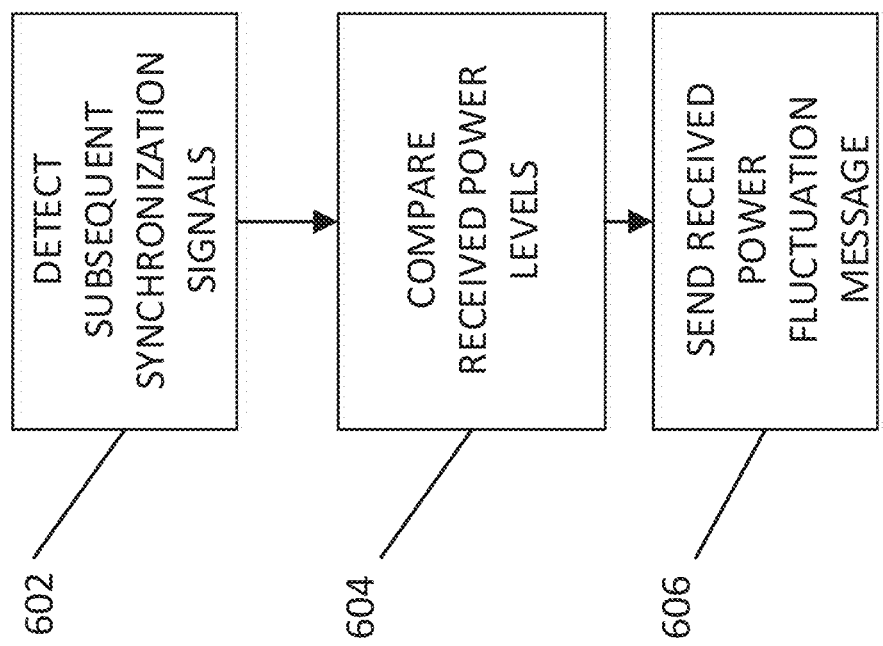
FIG. 6 illustrates a flow chart illustrating an exemplary channel tracking and feedback process incorporating aspects of the disclosed embodiments.

Even after the successful establishment of the initial access, the simultaneously transmitted synchronization signals can still be utilized for channel tracking. This is because the synchronization signals are transmitted periodically by the network node 110 in a broadcast manner. FIG. 6 illustrates an exemplary channel tracking process incorporating aspects of the disclosed embodiments. In this example, besides the data transmission/reception, the user node 120, once synchronized, can simply keep detecting 602 all or a part of these subsequently or periodically transmitted synchronization signals. The received power levels can be compared 604. As generally described herein, this comparing can include one or more of comparing current received power levels or comparing a current received power level to a past or historical received power level.

By monitoring the received power fluctuation of each synchronization signal, the user node 120 can track the variation of each path and feedback 606 this information via for example the PUCCH in a trigger-based manner. This feedback can be done either by the user node 120 actively, or as requested by the network node 110 through PDCCH. With such feedback information, once the path that is being utilized for communication becomes weak, communications can be readily switched to another candidate path or channel whose corresponding synchronization signal carries a higher received power level.

To assess the performance of the initial access scheme of the disclosed embodiments, a practical system setting is simulated. Specifically, a mmWave link operating at the carrier frequency of $f_c$=28 GHz is considered. The network node 110 is equipped with an 8×8 URA, and the user node 120 is equipped with a 4×4 URA. The row and column antenna spacings in both URAs are equal to half of the signal wave length. The detailed simulation parameters of this example are listed below in Table 1, in which all the parameter values are based on realistic system design consideration.

For example, similar to the LTE primary synchronization signals (PSSs) transmission, the sub-carrier spacing is set at $W_{sc}=15$ KHz and the synchronization signal transmission duration at $T_s=71.3$ μs (including a 4.7 μs cyclic prefix). The synchronization signal transmission duration of $T_s=71.3$ μs is sufficiently small to guarantee that the channel is invariant within one synchronization signal transmission duration even when the user node 120 is moving at speeds up to 30 km/h. In this case, the maximum Doppler shift is 30 km/h× 28 GHz/($3\times10^8$ m/s)≈778 Hz and the corresponding coherence time is 0.423/778 Hz≈544 μs>$T_s$. The synchronization signal in this exemplary scheme is transmitted periodically once every $T_p=5$ ms, the same as that in current LTE systems to keep a low total synchronization signal overhead of $T_s/T_p=1.427\%$. Considering the fact that the typical measurement results of the delay spreads, $\sigma_\tau$, in a mmWave channel is less than 30 ns (the corresponding 50% coherence bandwidth is approximately $B_{C,50}\approx\frac{1}{5}\sigma^\tau>6.67$ MHz), the bandwidth of the frequency band that the synchronization signals are transmitted on is set at W=1 MHz, such that the channel is relatively flat within the bandwidth.

Given the antenna settings at the network node 110 and user node 120, the numbers of beam patterns 104, 108 is set to be, respectively, $K_T=N_T=64$ at the network node 110 and $K_R=N_R=16$ at the user node 120. For the transmit beam pattern design, we assume the URA at the network node 110 is deployed at a certain height above the ground to cover the cell area, and the corresponding DoD angular space is set to be $S_T=\{(\theta_a, \theta_e)|0\leq\theta_a<2\pi, -\pi/2\leq\theta_e<-\pi/6\}$. Consequently, the transmit AWVs are chosen to be of the form of equation (6) with properly selected values of DoDs within $S_T$.

For the receive beam pattern design, it is assumed that the user node 120 and its URA may be held with any possible orientation. The corresponding DoA angular space is set to be $S_R=\{(\phi_a, \phi_e)|0\leq\phi_a<2\pi, -\pi/2\leq\phi_e<\pi/2\}$. Consequently, the receive AWVs are chosen to be the columns of a 16×16 matrix constructed by the Kronecker product of two 4×4 DFT matrices. In practice, the number of directional beam patterns at the network node 110 and the user node 120 can be less such that the hardware constraint is alleviated, e.g., when advanced beam pattern design methods are adopted that are able to widen the beam width, when the angular space of interest is reduced to be a sub-set of $S_B$ (or $S_U$) via cell sectorization.

TABLE 1

Simulation parameter setting

| Parameter | Value |
|---|---|
| Carrier frequency | 28 GHz |
| Network node (eNB) antenna | 8 × 8 URA |
| User Node (UE) antenna | 4 × 4 URA |
| The sub-carrier spacing, $W_{sc}$ | 15 KHz |
| SS transmission duration, $T_s$ | 71.3 μs |
| SS transmission period, $T_p$ | 5 ms |
| SS overhead ($T_s/T_p$) | 1.427% |
| SS bandwidth, W | 1 MHz |
| The number of beam patterns at the eNB, $K_T$ | 64 |
| The number of beam patterns at the UE, $K_R$ | 16 |
| SS sequence length $N_s$ | 128 |
| Cyclic prefix length $N_{CP}$ | 9 |
| The number of time delay hypotheses, $N_{dly} = 2WT_p$ | $1 \times 10^4$ |

TABLE 1-continued

Simulation parameter setting

| Parameter | Value |
|---|---|
| The number of frequency offset hypotheses, $N_{FO}$ | 16 |
| Cell radius | 100 meter |
| eNB transmission power | 30 dBm |
| UE noise FIGURE | 7 dB |
| Thermal noise power density | −174 dBm/Hz |

With $K_T=64$ at the network node 110, 64 synchronization signal sequences are designed accordingly. Considering the simulation setting that $W_{sc}=15$ KHz and W=1 MHz, in this example, the length of these synchronization signal sequences is set in the frequency domain to be $N_s=64$ such that all synchronization signal sequence elements in the frequency domain can be mapped onto the central 65 subcarriers (except the central DC subcarrier) for synchronization signal transmission, which occupy a bandwidth of 65×15 KHz=0.975 MHz<W. In this simulation, different cyclically shifted versions of a common Zaddoff-Chu (ZC) sequence are taken to form an orthogonal sequence set, where the ZC sequence is given by:

$$ZC_{N_{ZC},q}(k) = \begin{cases} \exp\left(-j\frac{q\pi k^2}{N_{ZC}}\right), & \text{for even } N_{ZC} \\ \exp\left(-j\frac{q\pi k(k+1)}{N_{ZC}}\right), & \text{for odd } N_{ZC} \end{cases} \quad (12)$$

with $N_{ZC}=64$ and q=1 being, respectively, the length and root of this ZC sequence. Then, to avoid high cross-correlation of these sequences, further multiply these length-64 sequences with a common interleaver and perform a 64-point DFT on each interleaved sequence. Afterwards, each synchronization signal sequence is mapped to the central 65 subcarriers (excluding the DC subcarrier) and converted to the time domain via a 128-point IFFT. A length-9 cyclic prefix (CP) is then added in the front of each time-domain synchronization signal. Finally, these synchronization signals are transmitted simultaneously via distinct directional beam patterns over the same frequency band, as shown in equation (6).

Figure 7:
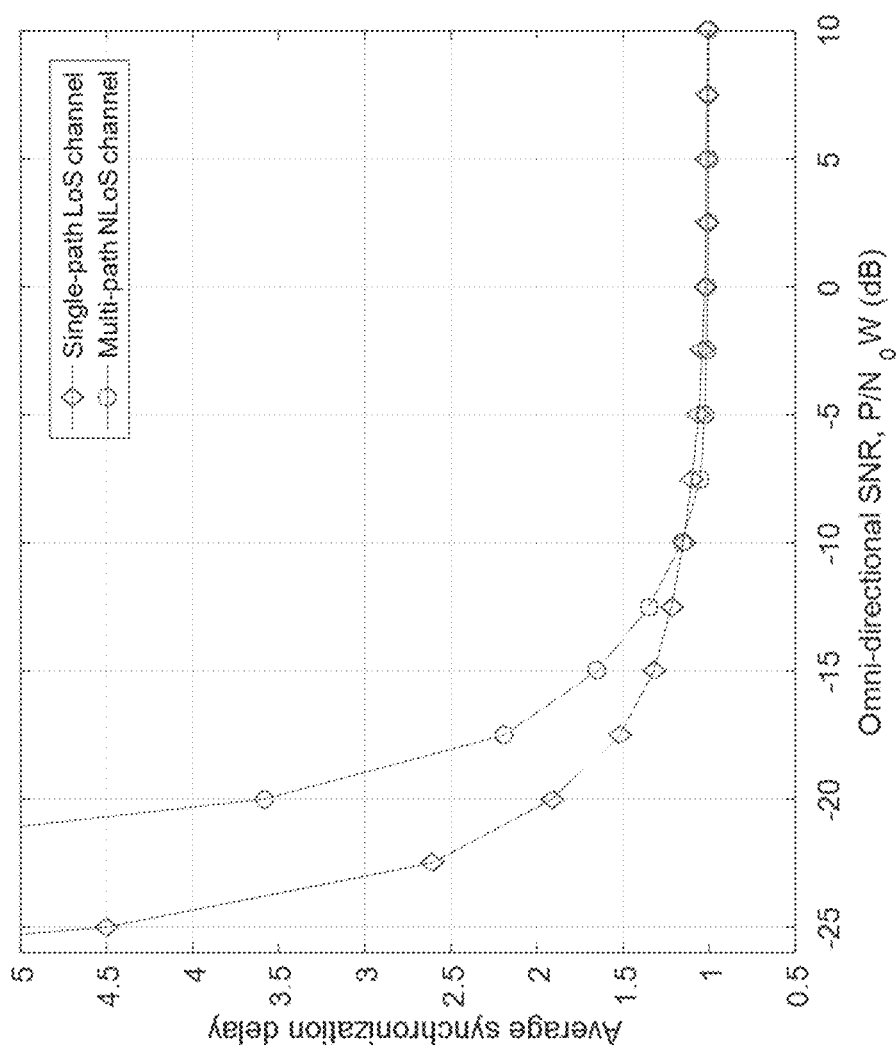
FIG. 7 is a graph illustrating an average synchronization delay in terms of the number of synchronization signal period required for a simulation of a system incorporating aspects of the disclosed embodiments.

In evaluating link level performance, FIG. 7 plots the average synchronization delay (in term of the number of synchronization signal periods required for synchronization) versus the received SNR for of the initial access scheme of the disclosed embodiments. Here P represents the joint effect of the transmit power and large-scale fading without taking into account of the transmit/receive BF gains and small scale fading. W is the bandwidth occupied by the synchronization signals and $N_0$ is the noise power spectral density (including the noise figure at the UE). Hence $P/N_0W$ represents the omni-directional received SNR. Both the single- and multi-path cases are considered. From FIG. 8, which represents the average power loss in a single path and multi-path channel, the following observations can be made.

When SNR<−10 dB, the initial access scheme of the disclosed embodiments performs better in the single-path channel than in the multi-path channel. This is because when SNR is low, the system is power hungry. In the multi-path NLoS channel, the channel power is distributed among multiple paths, making the power gain of each individual path lower than that of the single-path case, so is the energy captured by the detected candidate transmit/receive beam pair. Therefore, the multi-path has an SNR reduction effect and in turn leads to a longer synchronization delay.

When SNR>−10 dB, the initial access procedure of the disclosed embodiments performs better in the multi-path channel than in the single-path channel. This is because in the high SNR regime, the multiple clusters in the multi-path channel can provide certain spatial diversity and lead to multiple candidate transmit/receive beam pairs to be detected simultaneously. This spatial diversity outweighs the SNR loss at high SNRs.

Note that, besides the time/frequency synchronization and cell ID acquisition, we also want to acquire the channel direction information through the initial access procedure. Therefore, the "quality" of the detected DoDs/DoAs needs to be checked. To this end, we define the correct transmit-receive beam pair of the channel as:

$$(k_R^{(correct)}, k_T^{(correct)}) = \arg\max_{\substack{1 \le k_R \le K_R \\ 1 \le k_T \le K_T}} \frac{1}{N_{ch}} \sum_{t=1}^{N_{ch}} \|w_{k_R}^H H(t) b_{k_T}\|_2^2. \quad (13)$$

Intuitively, the correct transmit-receive beam pair is, among all the transmit-receive beam pair combinations, the one that captures the highest channel energy. The best transmit-receive beam pair $(k_R^{(best)}, k_T^{(best)})$ defined in equation (11), can be rewritten as:

$$(k_R^{(best)}, k_T^{(best)}) = \operatorname*{argmax}_{\substack{1 \le k_R \le K_R \\ 1 \le k_T \le K_T \\ |P_{k_R,k_T}| \ge \Gamma}} \overline{P}_{k_R,k_T} = \operatorname*{argmax}_{\substack{1 \le k_R \le K_R \\ 1 \le k_T \le K_T \\ |P_{k_R,k_T}| \ge \Gamma}} \frac{1}{N_{ch}} \quad (14)$$

$$\sum_{t=1}^{N_{ch}} \left\| \sqrt{\rho(d)}\, w_{k_R}^H H(t) b_{k_T} + \sqrt{\rho(d)} \sum_{i=1, i \ne k_T}^{K_B} w_{k_R}^H H(t) b_i \cdot (s_i^H \cdot s_{k_T}) + w_{k_R}^H Z(t) s_{k_T} \right\|^2$$

By comparing equations (13) and (14), we can see that equation (14) involves both potential interference between different synchronization signals and noise, which do not occur in equation (13). Hence the correct and best transmit-receive beam pairs may not be consistent with each other. Consequently, the detected best transmit-receive beam pair may not really capture the highest channel energy among all beam pairs. To quantify the performance loss caused by this channel direction inaccuracy, the following average power loss is defined:

$$P_{loss} = 10\log_{10} \left\{ \frac{E\left(\frac{1}{N_{ch}} \sum_{t=1}^{N_{ch}} \|w_{k_R^{(correct)}}^H H(t) b_{k_T^{(correct)}}\|_2^2\right)}{E\left(\frac{1}{N_{ch}} \sum_{t=1}^{N_{ch}} \|w_{k_R^{(best)}}^H H(t) b_{k_T^{(best)}}\|_2^2\right)} \right. \quad (15)$$

$$\left. (k_R^{(correct)}, k_T^{(correct)}) \ne (k_R^{(best)}, k_T^{(best)}) \right\}$$

Figure 8:
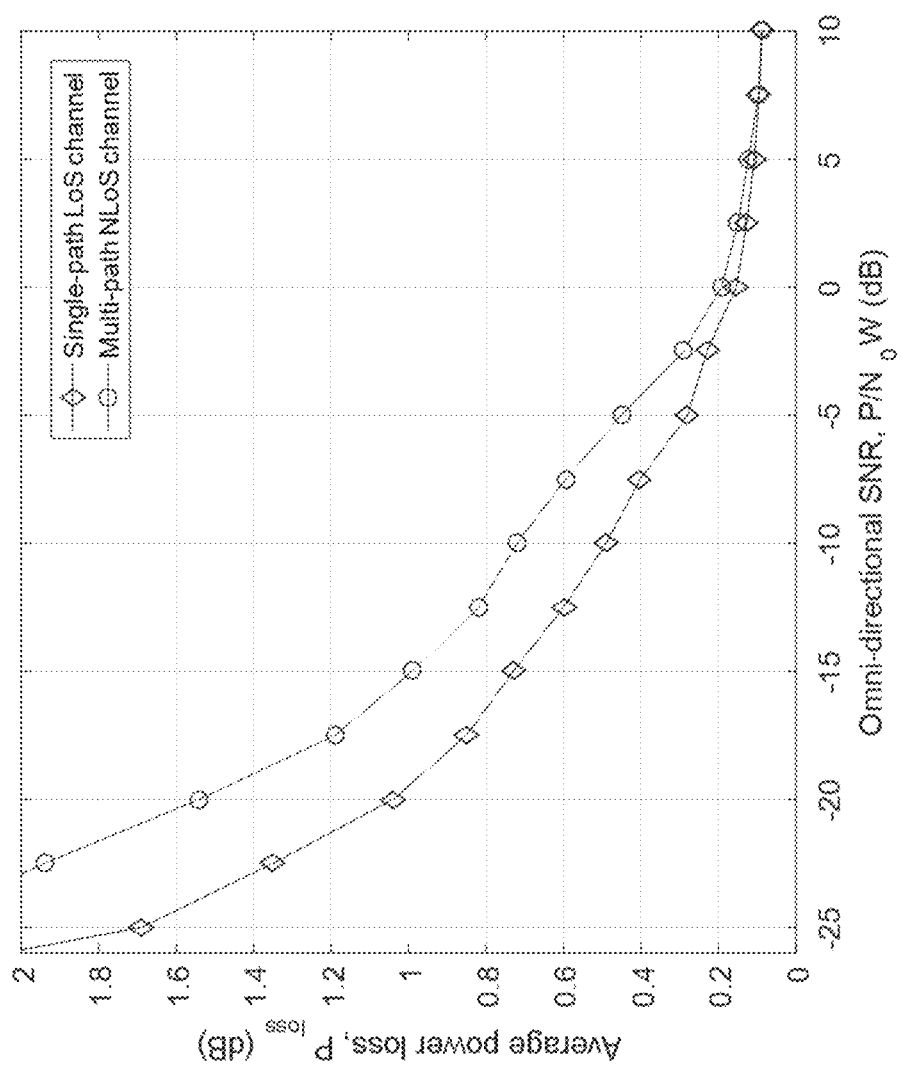
FIG. 8 is a graph illustrating average power loss caused by incorrect DoD detection in a simulation of a system incorporating aspects of the disclosed embodiments.

FIG. 8 plots the average power loss of the initial access scheme of the disclosed embodiments in the single-path and multi-path channels. It is seen that in both channels, the power loss caused by inaccurate channel direction detection is marginal, e.g., less than 1 dB when SNR is larger than −15 dB. Note that the definition in equation (15) only considers the simulation drops when the detected channel direction information is incorrect. When all the simulation drops are considered, the average power loss will be even less and ignorable.

In evaluating the system level performance, we consider a single-cell mmWave system with a radius of 100 meters. The user node 120 is assumed to be uniformly and independently distributed in the cell. The total transmit power at the network node 110 in this example is 30 dBm, the noise figure at the user node 120 is 7 dB, and the thermal noise power density is set at −174 dBm/Hz. The channel is randomly selected to be either in LoS (single-path) or NLoS (multi-path) status, and the large-scale omni-directional path loss from the network node 110 to the user node 120 is generated accordingly.

Figure 9:
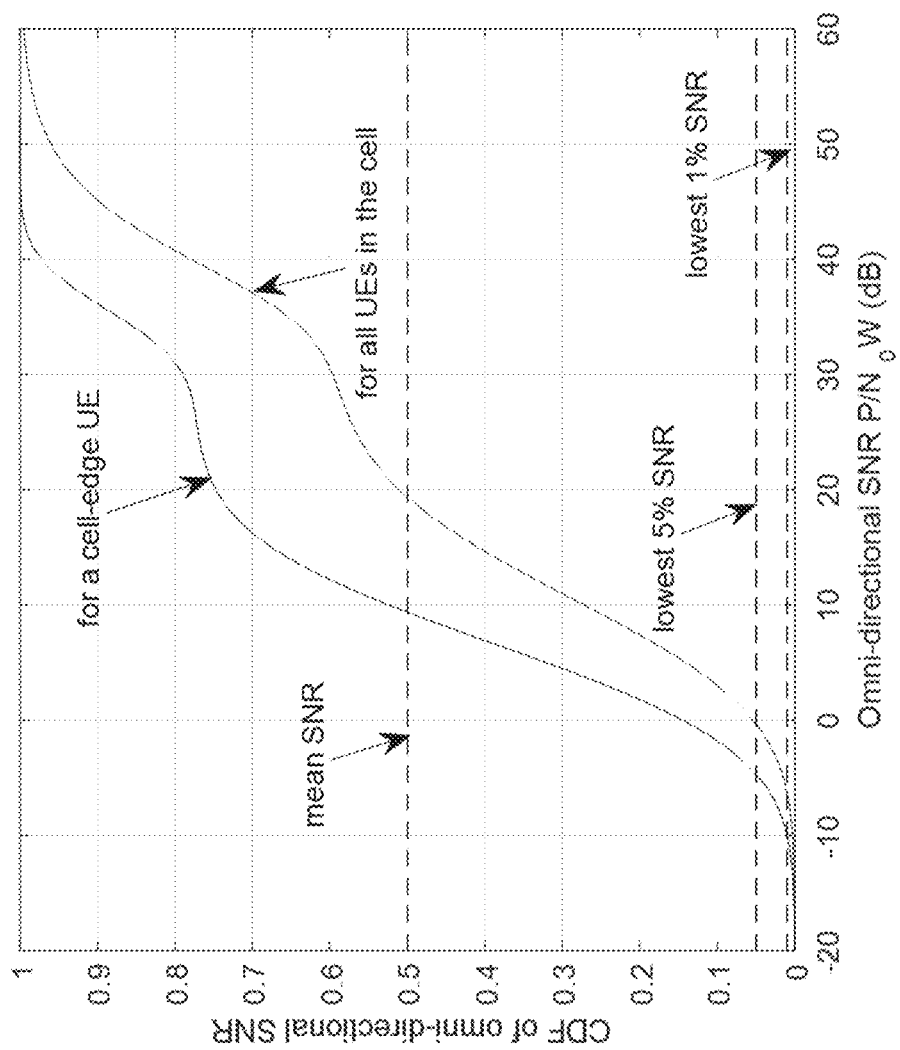
FIG. 9 illustrates a cumulative distribution function of the omnni-directional SNR for UEs in a mmWave cell with a radius of 100 meters in a simulation of a system incorporating aspects of the disclosed embodiments.

FIG. 9 plots the cumulative distribution function (CDF) of the omni-directional SNR at the user node 120 for, respectively, a random UE or a UE at cell edge. Also plotted are the 1% and 5% percentiles and median lines for the SNR. As seen in FIG. 9, the system omni-direction SNR is higher than −5 dB with 99% probability. Referring back to FIGS. 7 and 8, we can see that the system can get synchronized within one synchronization signal transmission period with a very high probability.

Figure 10:
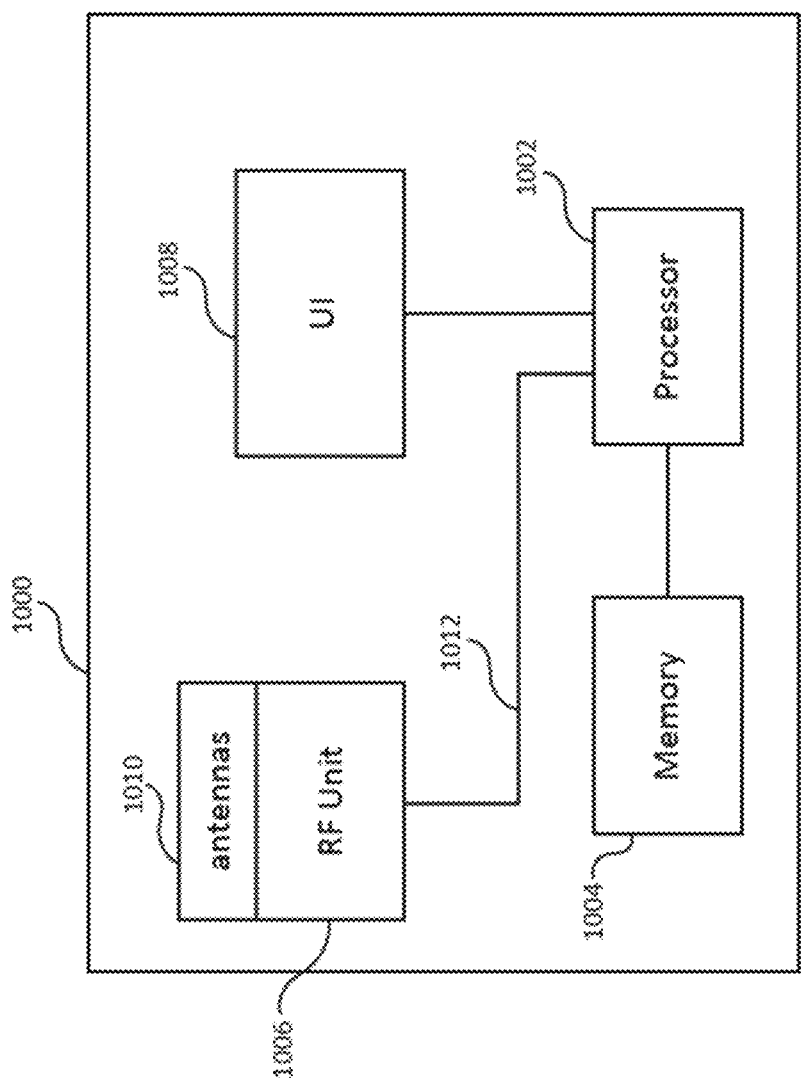
FIG. 10 is a block diagram of an exemplary computing architecture that can be used to implement aspects of the disclosed embodiments.

FIG. 10 illustrates a block diagram of an exemplary transceiver apparatus 1000 appropriate for implementing aspects of the disclosed embodiments. The transceiver apparatus 1000 is appropriate for use in a wireless network and can be implemented in one or more of the network node 110 or the user node 120, such as for the transceiver 114 and/or transceiver 122. The network node 110 can comprise or include a network node such as an Evolved Universal Terrestrial Radio Access Network (E-UTRAN) NodeB or evolved NodeB (eNB). The user node 120 can include various types of mobile computing devices, including various types of wireless communications user equipment such as cell phones, smart phones, tablet devices, and wirelessly connected automobiles. Alternatively the transceiver apparatus 1000 may be configured in or as an access node or base station in a wireless communication network.

The transceiver apparatus 1000 includes or is coupled to a processor or computing hardware 1002, a memory 1004, a radio frequency (RF) unit 1006 and a user interface (UI) 1008. In certain embodiments such as for an access node or base station, the UI 1008 may be removed from the transceiver apparatus 1000. When the UI 1008 is removed the transceiver apparatus 1000 may be administered remotely or locally through a wireless or wired network connection (not shown).

The processor 1002 may be a single processing device or may comprise a plurality of processing devices including special purpose devices, such as for example, digital signal processing (DSP) devices, microprocessors, graphics processing units (GPU), specialized processing devices, or general purpose computer processing unit (CPU). The processor 1002 often includes a CPU working in tandem with a DSP to handle signal processing tasks. The processor 1002, which can be implemented as one or more of the processors 112 and 124 described with respect to FIG. 1, may be configured to implement any of the methods described herein.

In the example of FIG. 10, the processor 1002 is configured to be coupled to a memory 1004 which may be a combination of various types of volatile and non-volatile computer memory such as for example read only memory (ROM), random access memory (RAM), magnetic or optical disk, or other types of computer memory. The memory 1004 is configured to store computer program instructions that may be accessed and executed by the processor 1002 to cause the processor 1002 to perform a variety of desirable computer implemented processes or methods such as the methods as described herein.

The program instructions stored in memory 1004 are organized as sets or groups of program instructions referred to in the industry with various terms such as programs, software components, software modules, units, etc. Each module may include a set of functionality designed to support a certain purpose. For example a software module may be of a recognized type such as a hypervisor, a virtual execution environment, an operating system, an application, a device driver, or other conventionally recognized type of software component. Also included in the memory 1004 are program data and data files which may be stored and processed by the processor 1002 while executing a set of computer program instructions.

The transceiver 1000 can also include an RF Unit 1006 coupled to the processor 1002 that is configured to transmit and receive RF signals based on digital data 1012 exchanged with the processor 1002 and may be configured to transmit and receive radio signals with other nodes in a wireless network. In certain embodiments, the RF Unit 1006 includes receivers capable of receiving and interpreting messages sent from satellites in the global positioning system (GPS) and work together with information received from other transmitters to obtain positioning information pertaining to the location of the computing device 1000. To facilitate transmitting and receiving RF signals the RF unit 1006 includes an antenna unit 1010 which in certain embodiments may include a plurality of antenna elements. The multiple antennas 1010 may be configured to support transmitting and receiving MIMO signals as may be used for beamforming. The antenna unit 1010 of FIG. 10 can be implemented as one or more of the antenna unit 102 or the antenna unit 106 shown in FIG. 1.

The UI 1008 may include one or more user interface elements such as a touch screen, keypad, buttons, voice command processor, as well as other elements adapted for exchanging information with a user. The UI 1008 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the presently disclosed disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A network node for millimeter wave cellular communication in a wireless communication system, the network node including a processor and a transceiver, the processor being configured to:
   generate a set of at least two synchronization signal sequences;
   construct a synchronization signal for each synchronization signal sequence in the set of at least two synchronization signal sequences to create a set of synchronization signals, such that each of the synchronization signals in the set of synchronization signals has an auto correlation and cross correlation below a threshold value with any other synchronization signal in the set of synchronization signals;
   generate a set of directional beam patterns, wherein each beam pattern in the set of directional beam patterns corresponds to one of the synchronization signals in the set of synchronization signals; and
   superimpose the constructed synchronization signals together; and
   wherein the transceiver is configured to transmit the synchronization signals in the set of synchronization signals using the beam pattern for each synchronization signal over a same time frequency resource; and
   wherein the same time frequency resource comprises resource elements that span across multiple sub-carriers and orthogonal frequency division multiplexing (OFDM) symbols.

2. The network node according to claim 1, wherein the transceiver is configured to receive a message that identifies one or more index values associated with respective ones of the synchronization signals having a highest received power level among all of the synchronization signals, and the processor is configured to select at least one index value associated with a highest received power level, and select a transmission mode of the network node to a transmission channel corresponding to a direction of departure (DoD) associated with a synchronization signal of the selected index value.

3. The network node according to claim 2, wherein the processor is configured to select at least one other index value associated with at least one other highest received power level, and select the transmission mode of the network node for parallel transmission in transmission channels corresponding to the DoD associated with the synchronization signal of each selected index value.

4. The network node according to claim 2, wherein the processor is configured to compare a current received power level of a current transmission mode to the highest received power levels corresponding to the synchronization signals associated with the identified one or more index values, and switch the transmission mode of the network node to one or more transmission channels corresponding to the synchronization associated with identified index values when the highest received power levels are greater than the current received power level.

5. The network node according to claim 1, wherein the transceiver is configured to periodically transmit the synchronization signals over the same time-frequency resource simultaneously.

6. The network node according to claim 1, wherein the processor is configured to construct each synchronization signal using one synchronization signal sequence from the set of synchronization signal sequences and superimpose the constructed synchronization signals together.

7. The network node according to claim 1, wherein the processor is configured to select each synchronization signal sequence from a Gold or Kasami sequence set.

8. The network node according to claim 1, wherein the processor is configured to select each synchronization signal sequence from a set of Zadoff-Chu sequences with different roots.

9. The network node according to claim 1, wherein the processor is configured to select each synchronization signal sequence from a set of sequences that are different cyclically shifted versions of a common Zadoff-Chu sequence.

10. The network node according to claim 1, wherein the processor is configured to select each synchronization signal sequence from a set of Golay complementary orthogonal sequences.

11. The network node according claim 8, wherein the processor is configured to interleave the selected sequences using a common interleaver.

12. The network node according to claim 8, wherein the processor is configured to scramble the selected sequences using a common scrambling sequence.

13. A user node for millimeter wave cellular communication in a wireless communication system, the user node including a processor and a transceiver, wherein the transceiver is configured to receive at least one signal including a set of superimposed synchronization signals over a same time frequency resource comprising resource elements that span across multiple sub-carriers and orthogonal frequency division multiplexing (OFDM) symbols, and the processor is configured to:
   detect at least one synchronization signal from the set of superimposed synchronization signals in the at least one received signal;
   compare a received power level of the at least one synchronization signal from the set of superimposed synchronization signals with a received power level of at least one other synchronization signal from the set of superimposed synchronization signals;
   identify at least one index value associated with at least one synchronization signal having a highest received power level among all of the synchronization signals from the set of superimposed synchronization signals; and
   wherein the transceiver is configured to transmit the identified at least one index value.

14. The user node according to claim 13, wherein the processor is configured to:
   detect at least one other synchronization signal from a set of subsequently received signals;
   compare a received power level of the at least one other received synchronization signal to a received power level of at least one other received synchronization signal from the set of subsequently received signals; and
   wherein the transceiver is configured to transmit a report identifying a received power fluctuation of each received synchronization signal.

15. A non-transitory computer-readable medium storing instructions, which when executed by a processor of a network node for millimeter wave cellular communication in a wireless communication system, the network node including the processor and a transceiver, cause the processor to:
   generate a set of at least two synchronization signal sequences;
   construct a synchronization signal for each synchronization signal sequence in the set of at least two synchronization signal sequences to create a set of synchronization signals, such that each of the synchronization signals in the set of synchronization signals has an auto correlation and cross correlation below a threshold value with any other synchronization signal in the set of synchronization signals; and
   generate a set of directional beam patterns, wherein each beam pattern in the set of directional beam patterns corresponds to one of the synchronization signals in the set of synchronization signals;
   superimpose the constructed synchronization signals together; and
   control the transceiver to transmit the synchronization signals in the set of synchronization signals using the beam pattern for each synchronization signal over a same time frequency resource, wherein the same time frequency resource comprises resource elements that span across multiple sub-carriers and orthogonal frequency division multiplexing (OFDM) symbols.

* * * * *